United States Patent [19]

Precicaud

[11] 4,251,929
[45] Feb. 24, 1981

[54] HORIZON PROJECTION DEVICE FOR AIRCRAFT SIMULATOR

[75] Inventor: Jean Precicaud, Elancourt, France

[73] Assignee: MATRA, Paris, France

[21] Appl. No.: 857,751

[22] Filed: Dec. 5, 1977

[30] Foreign Application Priority Data

Dec. 8, 1976 [FR] France ............................... 76 36998
Apr. 13, 1977 [FR] France ............................... 77 11124

[51] Int. Cl.³ .................................................. G09B 9/08
[52] U.S. Cl. ...................................... 434/44; 40/406; 272/8 P; 350/420; 353/120; 353/2; 353/122
[58] Field of Search ................. 35/12 N, 12 K, 25; 272/8 R, 8 P; 350/181; 40/406, 407; 353/120, 2, 122; 352/132

[56] References Cited

U.S. PATENT DOCUMENTS

| | | | |
|---|---|---|---|
| 3,114,979 | 12/1963 | Fox | 35/12 N |
| 3,233,508 | 2/1966 | Hemstreet | 35/12 N |
| 3,269,030 | 8/1966 | Poole et al. | 35/12 N |
| 3,367,046 | 2/1968 | Neuberger | 35/12 N |
| 3,458,651 | 7/1969 | Dryden | 35/12 N X |
| 3,580,660 | 5/1971 | LaRussa | 35/12 N X |
| 3,603,726 | 9/1971 | Garber et al. | 35/12 N X |
| 3,613,264 | 10/1969 | Vitka et al. | 272/8 R X |
| 3,718,989 | 3/1973 | McKnight | 35/12 N |
| 3,738,036 | 6/1973 | Landsinger et al. | 40/406 |
| 3,741,638 | 6/1973 | Geary | 35/12 N X |
| 3,774,990 | 11/1973 | Beck et al. | 35/12 N X |
| 3,843,244 | 10/1974 | Facchini | 353/2 |
| 3,904,289 | 9/1975 | Yager | 35/12 N X |
| 3,991,486 | 11/1976 | Perderian et al. | 35/12 N |
| 4,131,345 | 12/1978 | Carollo | 35/12 N X |

OTHER PUBLICATIONS

F. A. Jenkins and H. E. White, *Fundamentals of Optics*, 3rd Ed., McGraw Hill, c. 1957, pp. 504, 505.

*Primary Examiner*—Richard C. Pinkham
*Assistant Examiner*—Scott L. Brown
*Attorney, Agent, or Firm*—Daniel M. Rosen

[57] ABSTRACT

An horizon projection device for an aircraft simulator.

The device comprises an aerial image 4 of a part of the Earth's surface, an optical image projector comprising a variable magnification system 13, an optical scanning device 18 and a wide angle projection lens 17. The optical system 13 forms in the focal plane of the wide angle lens 17 an intermediate image whose dimensions depend on the magnification. Controls responsive to the altitude, to the attitude and to the heading simulated by the pilot act on the magnification of the optical system 13, particularly to correct an apparent altitude variation due to the shift between the eyes of the pilot and the wide angle lens, during simulation of the aircraft going over on to its back.

6 Claims, 6 Drawing Figures

HORIZON PROJECTION DEVICE FOR AIRCRAFT SIMULATOR

The invention relates to a horizon projection device for an aircraft simulator of the kind comprising:

an image, particularly flat, forming an aerial representation of a part of the Earth's surface;

optical means for projecting the image on to a concave spherical surface, these optical projection means comprising a wide angle lens capable of projecting the image on to the concave spherical surface;

a scanning device for moving the projection of the image over the concave spherical surface;

rotation means provided for rotating the projection of the image about its centre;

and control means responsive to the heading, to the attitude and to the altitude of the aircraft displayed by the pilot, provided for operating on the means for rotating the projection of the image, on the dimensions of the image and on the scanning device for giving to the projection of the horizon the position and the dimensions corresponding to the alterations of course of the aircraft displayed by the pilot.

It is known that an aircraft simulator is used for training pilots on the ground and aims at restoring as well as possible the conditions of flight and the impressions felt by the pilot.

The invention has as its aim especially to make the horizon projection device such that it answers better than heretofore the different demands of practice and particularly such that it improves the effect of simulation and the performances obtained with the simulator.

According to the invention, a horizon projection device for an aircraft simulator is characterised by the fact that the pilot is installed inside the concave spherical surface, that variable magnification optical means are provided between the image, forming the aerial representation of a part of the Earth's surface, and the wide angle optical lens, these variable magnification optical means being able to form, in the focal plane of the wide angle optical lens, an intermediate image whose dimensions depend on the magnification of these variable magnification means, the control means responsive to the altitude of the aircraft displayed by the pilot being capable of acting on the magnification of the variable magnification optical means, these control means permitting particularly to simulate going over to upside down flight of the aircraft and being capable of modifying the magnification of the variable magnification optical means, so that when the pilot installed in the simulator orders the aircraft on to its back, the apparent altitude variation which would be due to the shift between the eyes of the pilot and the wide angle lens is compensated for.

The means for rotating the projection of the image on the spherical surface are controlled in connection with the alterations of heading of the aircraft.

The means for rotating the projection of the image can include mechanical means capable of rotating the image itself about its axis; in this case the image is mounted on a rotary turntable driven by means of a servo-mechanism about its axis. The rotation is controlled by calculating means depending on the alteration of heading of the aircraft.

According to a variation, the means for rotating the projection of the image comprise an optical device of the Wollaston prism type, disposed in the path of the light rays and capable, by rotation about the axis of the light rays, of causing the rotation of the projection of the image about its centre, the image itself remaining fixed. The rotation of the optical device (Wollaston prism) is also achieved by a servo-mechanism controlled by computing means, depending on the alterations of heading of the aircraft.

The scanning device is advantageously an optical scanning device comprising two total reflection mirrors or prisms disposed so as to cause the light beam to undergo two successive reflections with 90° change of direction; the first prism or mirror is mounted so as to be able to rotate about the axis of the incident beam, said first prism, during this rotation, being rigidly locked mechanically with the second prism (or mirror) and with the wide angle lens, the whole thus rotating about the axis of the incident beam; the second prism is mounted so as to be able to rotate about an axis perpendicular to the rotational axis of the first prism, the wide angle lens also rotating with this second prism but the first prism remaining on the other hand, motionless during rotation of the second prism (or mirror). This optical scanning device causes the axis of the light rays to travel through a spherical field.

The rotational movements of the two prisms (or two mirrors) are ensured by servo-mechanisms controlled by a computer in terms of the simulated alterations of course of the aircraft.

The variable magnification optical system is advantageously formed by a zoom whose magnification variations are controlled by a computer, with respect to the alterations of course of the aircraft, particularly with respect to the altitude of the aircraft and its turning in flight on to its back (roll).

The angular field of the wide angle lens may reach 200°.

Advantageously means are provided for giving to the pilot the impression of the ground moving past.

The horizon projection device then comprises:

means for causing patterns to pass over the image forming the aerial representation of a part of the Earth's surface, at a speed which depends on the simulated speed of the aeroplane with respect to the ground;

means for rotating the overall direction of movement of the patterns in response to the action of the pilot on the heading of the aircraft;

and means for maintaining, during a simulated change of heading, the set of patterns able to pass over the image, motionless in rotation in relation to the centre of this set and in relation to the contour of the image forming an aerial representation of a part of the Earth's surface.

The patterns, capable of passing over the image forming an aerial representation of a part of the Earth's surface, are advantageously formed by patches, luminous or dark, obtained by a mixture of immiscible liquids having closely related densities, e.g. oil of silicon and coloured water, or conversely; this mixture of liquids is set in motion between two transparent plates, particularly made of glass, the whole being such that the plates and the bed of liquid flowing between the plates may rotate about an axis perpendicular to the average plane of said plates; the means for maintaining the set of patterns motionless in rotation during a simulated change of heading, comprise two circular fixed discs, sealingly disposed in apertures provided in said plates, these discs being formed from a transparent material, particularly glass, and having their centre located on the rotational axis of the plates, the whole being such that during rotation of the plates, corresponding to an alteration of heading the discs remain fixed and the set of patterns formed by the mixture of the immiscible liquids remains motionless in rotation due to the inertia of the liquids and the viscosity and adhesion of these liquids to the surfaces of the motionless discs.

The output of the pump, setting in motion the mixture of immiscible liquids, is slaved to the simulated speed of movement of the aircraft, so that the speed at which the patterns pass by is in relation with the speed of the aircraft.

An emulsionizer, comprising a propeller disposed between the plates, upstream of the motionless discs, is provided for maintaining the presence of the patterns formed by drops of immiscible liquids.

The set of patterns which moves past is optically projected by means of a variable focal length lens (zoom) whose magnification depends on the altitude of the aircraft, on to the image forming an aerial representation of a part of the Earth's surface. The set of patterns is advantageously lighted up by a light beam disposed on the side of the plates and the discs opposite that where is to be found the variable focal length lens for projection.

Advantageously a distorting lens is provided, at the output of the variable focal length lens, capable of restoring the angles at which the pilot sees successively the same object, when the horizontal distance from this object to the point situated straight up from the pilot varies.

The invention consists, apart from the arrangements outlined hereabove, of certain other arrangements which will be more explicitly discussed hereafter in connection with a particular embodiment described with reference to the accompanying drawings but which is in no wise limiting.

FIG. 1 of these drawings shows schematically a general view of a simulator equipped with a projection device of the invention.

Figure 6:
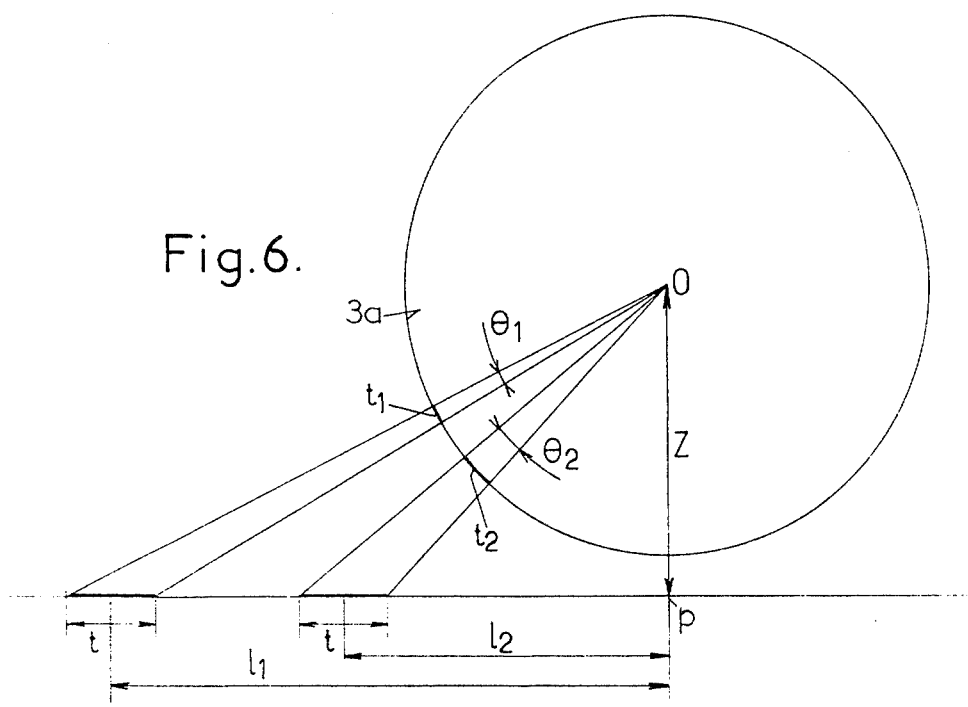

FIG. 6, finally, is a diagram explaining the use of a distorting lens for projection of the patterns.

Figure 1:
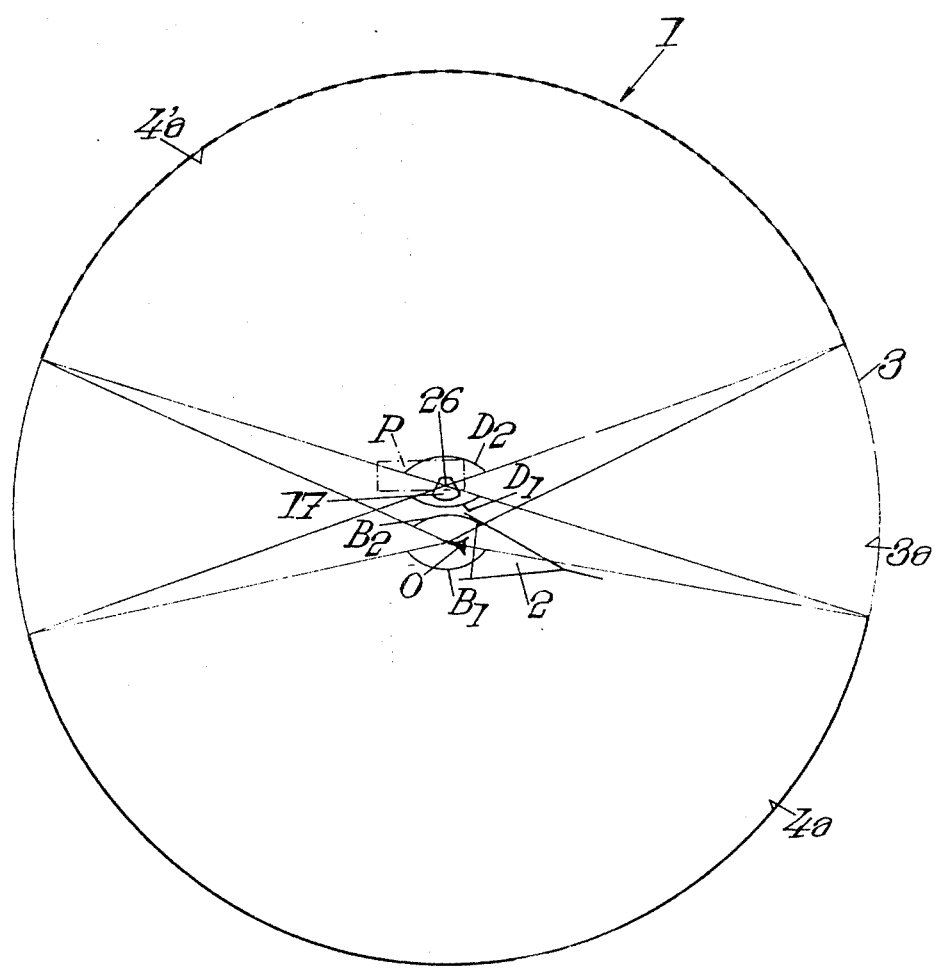

Referring to FIG. 1, there can be seen an aircraft simulator 1 comprising a portion 2 of the cabin of the aircraft considered, placed inside a sphere 3. The pilot is installed in the cabin portion so that his eyes 0 are substantially located at the centre of sphere 3, or adjacent this centre. Cabin portion 2 may be fixedly mounted inside sphere 3. It can be mentioned, by way of a non limiting example, that the diameter of sphere 3 is of the order of 5 to 10 meters.

To give the pilot an impression as close as possible to the impression felt in the aircraft in real flight, a device P is provided for projecting the horizon on to the concave spherical inner surface 3a of sphere 3. It is to be understood that by ensuring, by means of the projection device P, the movements of the Earth's horizon contour separating the sky from the ground in response to actions exercised by the pilot on the heading, attitude and altitude controls of the aircraft, the pilot can be given an impression close to reality.

Figure 2:
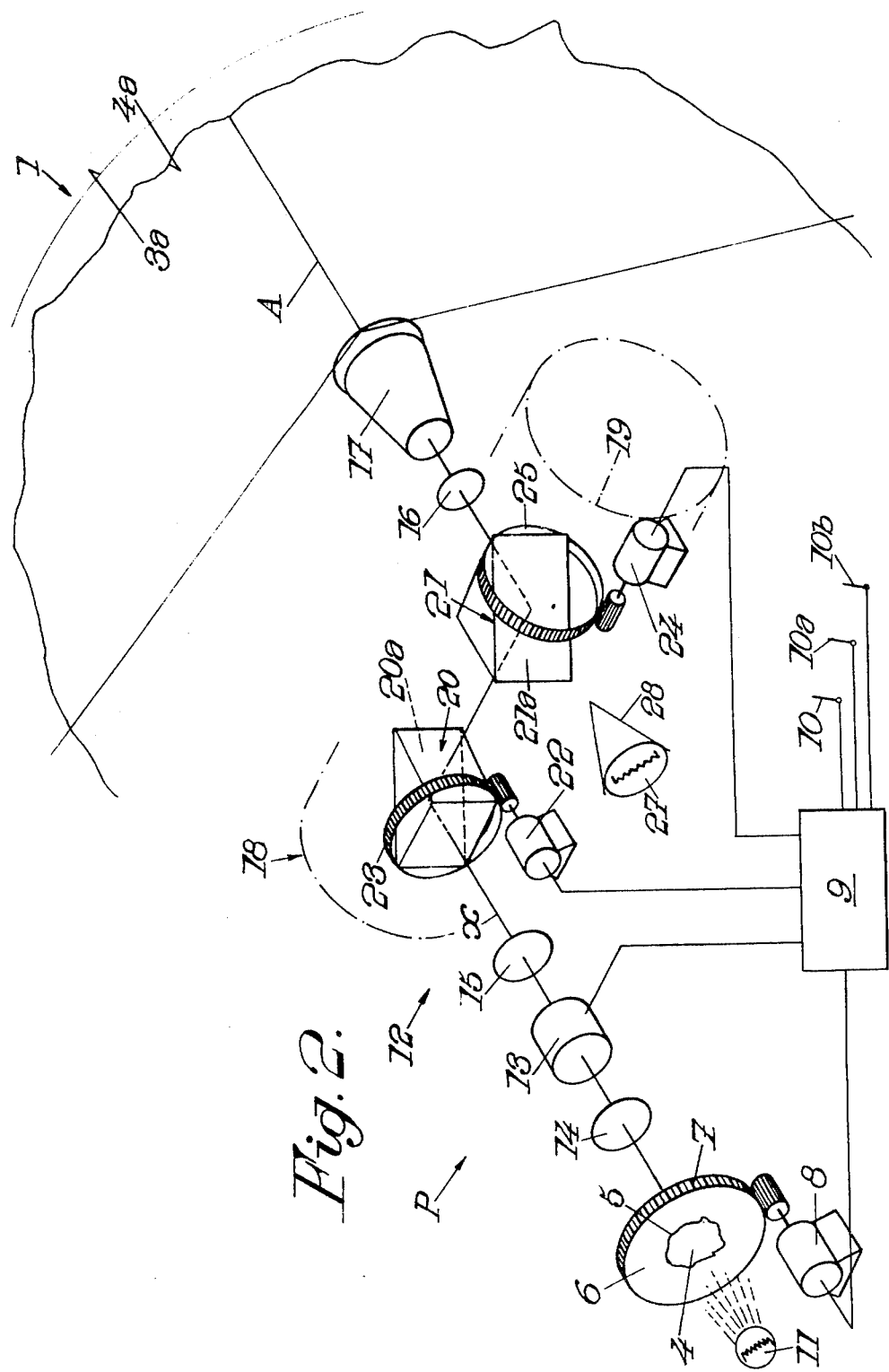
FIG. 2 is a diagram of the horizon projection device.

As can be seen in FIG. 2, projection device P comprises an image 4, particularly flat, forming a representation of a part of the Earth such as seen from an aeroplane. This image 4 may be a synthetic image, artificially reconstituted, and formed by coloured patches defined by a contour 5, substantially circular, whose edges are indented in the way in which a distant mountainous line may appear to the eyes of the pilot. This indented contour 5 improves the sensation of change of heading of the aircraft.

The image 4 of the Earth appears on a black background. This image 4 is advantageously obtained by a photographic print on a glass plate 6. This plate 6 is mounted on a turntable 7 enabling image 4 to be rotated about its axis, by means of a driving servo-mechanism 8. Rotation of turntable 7 is controlled by computing means 9 in accordance with the alterations of heading of the aircraft. These alterations of heading are controlled by the pilot who operates on an appropriate control 10.

Behind glass plate 6 is provided a device 11 for lighting image 4.

Device P comprises in addition optical projection means 12 for projecting image 4 on to spherical surface 3a.

These optical means comprise a variable magnification optical system 13 disposed, for example, between two lenses 14,15, lens 14 itself being disposed between optical system 13 and image 4.

The variable magnification optical system 13 is advantageously formed by a zoom; the variations of magnification of optical system 13 are controlled from computer 9 according to the alterations of course of the aircraft.

Lens 15 situated at the output of zoom 13 focuses the light rays coming from image 4 in the focal plane 16 of a wide angle projection lens 17 commonly called "fish eye".

The light rays, between lens 15 and focal plane 16, pass through an optical scanning device 18 capable of causing axis A of the light rays of the projection of the image to travel through a spherical field. More exactly, this axis A will be able to rotate substantially about a fixed point 26 (FIG. 1) and scan, while pivoting about this point, a solid angle close to $4\pi$.

The scanning device is formed by a turret 19 in which are provided two total reflection prisms 20,21 according to the representation of FIG. 2. These prisms are disposed so as to be able to cause the light beam to be subjected to two successive reflections with 90° change of direction, at each reflection. It is obvious that each prism 20,21 or that the two prisms could be replaced by one or two equivalent mirrors, sloping at 45°.

In other words, the axis of the beam emerging from lens 15 falls with an incidence of 45° on to the reflecting face 20 of the first prism 20, the axis of the beam reflected by this face 20a falls with an incidence of 45° on to the reflecting face 21a of prism 21.

The first prism 20 is mounted in a mechanical system permitting a rotation of this prism about axis x of the incident beam. This rotation is controlled by a servo-mechanism 22 driving a crown-wheel 23.

The second prism 21 is mounted in a mechanical system which is rotated with the first prism 20 about axis x; wide angle lens 17 is also supported by this mechanical system so as to rotate with prism 21 about axis x during rotation of prism 20 controlled by servo-mechanism 22. This second prism 21 (or mirror) as well as wide angle lens 17 are, furthermore, mounted so as to be able to rotate in relation to prism 20 about an axis perpendicular to axis x and corresponding to the axis of the light beam which falls on prism 21.

The rotation of prism 21 and of lens 17, in relation to prism 20 is achieved by a servo-mechanism 24 driving a crown-wheel 25. This servo-mechanism 24, during the overall movement controlled by servo-mechanism 22 about axis x is itself rotated with prism 21 and lens 17 about axis x.

The conjugate rotations of both prisms 20,21 enable axis A to scan completely the spherical field.

The rotational movements of prisms 20,21 are controlled from computer 9 in accordance with the alterations of course of the aircraft, i.e. in accordance with the action of the pilot on controls 10a, 10b . . . able to modify the attitude and the altitude of the aircraft.

Since the wide angle projection lens 17 has a very small focal distance in relation to the radius of the sphere on which is projected image 4, it will be understood that the intermediate image of image 4, before its projection by wide angle lens 17, may be formed practically in the focal plane 16 of this wide angle lens.

This wide angle lens 17 allows the projection of the image to occupy an angular field able to reach 220°.

It will be noticed, according to FIG. 1, that the optical projection axis of the wide angle lens is perpendicular to the simulated flight direction of the aeroplane; the eye 0 of the pilot looks substantially in this flight direction.

The optical scanning device shown in FIG. 2 and described hereabove, enables the projection of the image to be moved over the whole concave spherical surface.

It is to be noted that if the angular field of wide angle lens 17 covered a sufficient portion of the concave spherical surface, wide angle lens 17 could be maintained fixed in relation to the sphere and turret 19 could be dispensed with. The scanning device could then consist simply of means for moving image 4 in the transverse directions with respect to axis x. These transverse movements of image 4 would cause, in the projection of the image by wide angle lens 17, movements of this image over the concave spherical surface. It is clear however that, because of the immobility of lens 17, according to this variation, the surface on which image 4 could move would be limited to the surface included in the angular field of lens 17.

Behind the wide angle projection lens, and in the case of the embodiment of FIG. 2, behind prism 21, a lighting lamp 27 is provided for lighting, e.g. with a blue light, the portion of the spherical surface on which the image of the Earth is not projected, so as to represent the sky. In front of this lamp 27, as shown schematically in FIG. 2, there is provided a mask 28, e.g. conical in shape, for preventing this lamp from lighting up the zone of the spherical surface on which is found projection 4a. Lamp 27 and mask 28 are supported, by mechanical means (not shown), so that their axis merges with the direction of the axis of the beam falling on wide angle lens 17, and so that said lamp 27 and mask 28 are rotated with prism 21 and lens 17.

The operation of the projection device follows immediately from the preceding explanations.

The projection 4a of image 4 of the Earth with its irregularities is observed by the pilot installed in the simulator. This projection will turn about its axis in accordance with the alterations of heading of the aircraft.

This projection 4a will moreover move over the whole inner spherical surface in accordance with the attitude of the aircraft, these movements being essentially obtained thanks to scanning device 18 controlled by computer 9.

The variations of altitude of the aircraft result in a variation of the magnification of device 13, so that the angle of vision, by the pilot, of the projected Earth's contour diminishes when the altitude increases and conversely. This result is obtained by diminishing (or by increasing) the magnification of zoom 13, so that the intermediate image formed in focal plane 16 of wide angle lens 17 diminishes (or increases); the exiting angle of the light beam representing the Earth's contour diminishes (or increases) and the projected image is reduced (or increased). The angle of vision of the Earth's contour formed between the vertical and a straight line passing through the centre of the eye of the pilot and resting on the edge of the contour diminishes or increases.

The variable magnification device 13 comes into play moreover when the pilot places his aircraft in on the back flight.

In fact it is not possible physically to ensure the coincidence between the eyes of the pilot 0 (FIG. 1) and the point of convergence 26 of the beam leaving wide angle lens 17.

Therefore, if, in normal flight, projection 4a of the Earth's image on the spherical surface 3a is seen at angle $B_1$ by the pilot, the angle of projection from point 26 is equal to $D_1$. This latter angle $D_1$ is different from $B_1$.

When the aircraft is ordered on to its back, projection device P will cause a rotation of 180° of the projected image 4a about point 26. The projected image will be at 4'a. It will still be seen at the same angle $D_2=D_1$ from point 26. On the other hand, the eye 0 of the pilot will see this projection 4'a at an angle $B_2$ different from angle $B_1$, so that if no correction were made, the pilot would have an impression of a great variation of altitude corresponding to the difference between angles $B_1$ and $B_2$.

The variable magnification device 13 allows the dimensions 4'a to be modified so that this image is seen by the eye 0 at the same angle $B_1$.

Thus, when the pilot places his aircraft in on the back flight, the simulation of the reality remains excellent since this going over on to its back will not be accompanied by a sudden variation of altitude which would falsify the simulation.

It is to be noted that the variable magnification device 13 may be of any appropriate kind other than the example of the zoom envisaged. Device 13 could be formed by a set of lenses one at least of which would be axially movable to cause variation of the magnification of the whole system.

It is also to be noted that the simulator comprises optical projection devices permitting any moving body coming into the field of vision of the pilot to be projected on the concave spherical surface 3a.

The projection device for the simulator comprises advantageously means 30 for causing patterns to move past over image 4 at a speed which depends on the simulated speed of the aeroplane in relation to the ground.

Figure 4:
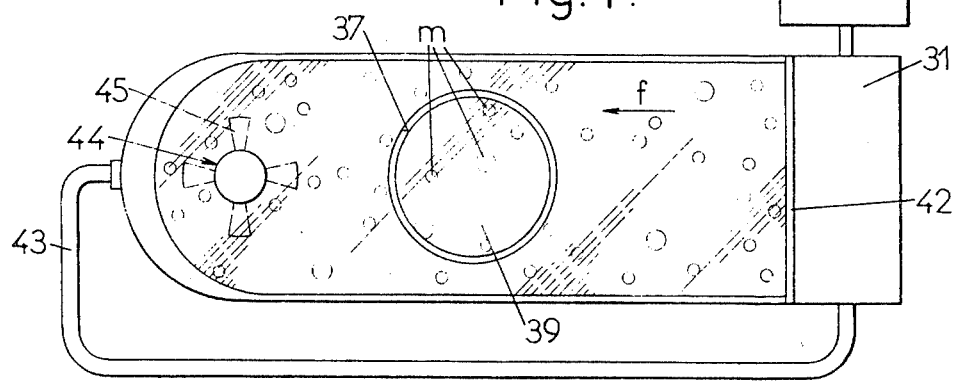
FIG. 4 is a simplified top view of the means for effecting the moving past of the patterns.

Patterns m (FIG. 4) adapted to move past over image 4 are advantageously formed by patches, luminous or dark, obtained by a mixture of two immiscible liquids having closely related densities; for example a mixture of silicon oil and coloured water is used or, conversely, coloured silicon oil and transparent water. This mixture of two immiscible liquids forms an emulsion of one liquid in the other and patches are formed by drops of one of the liquids in the other, unevenly distributed.

The moving past of the patches forming the patterns m is achieved by setting the mixture of liquids in motion by means of a pump 31. The mixture circulates between two transparent rectangular plates 32,33, e.g. two glass plates.

Figure 3:
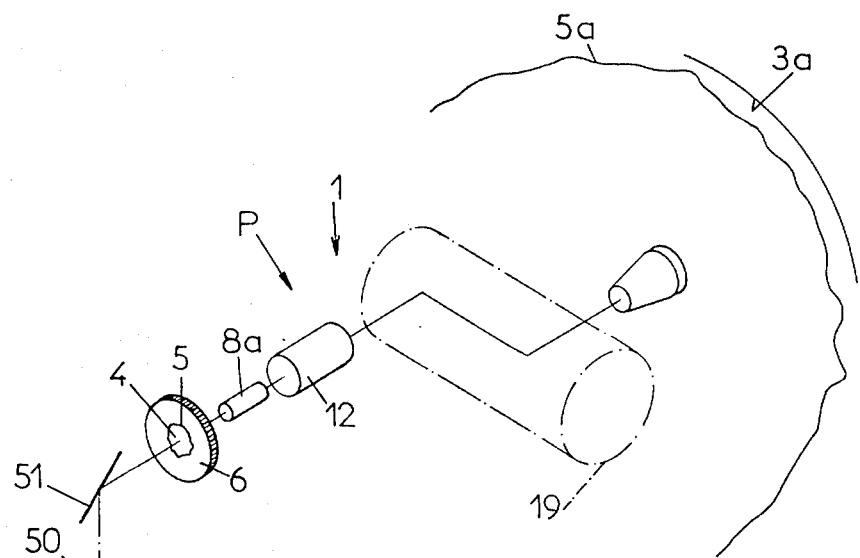
FIG. 3 is a schematic representation of a horizon projection device, with the ground moving past, according to the invention.
Figure 3:
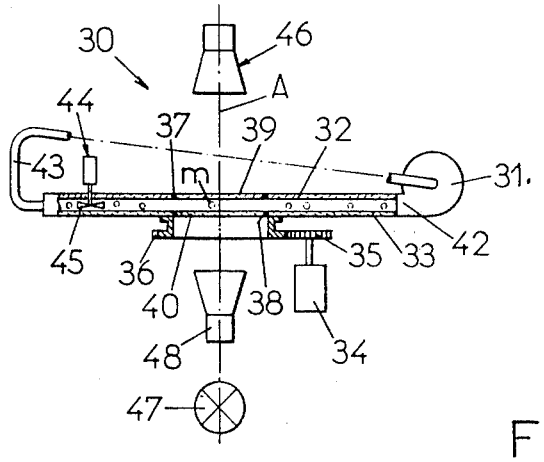

As schematically shown in FIG. 3, plates 32,33 are mounted so as to be rotatable about an axis A perpendicular to these plates.

The edges of the plates are sealingly connected by walls defining a rectangular section channel for the flow of the mixture of liquids.

The rotation of plates 32,33 can be effected by a motor 34 which drives through a pinion 35 a crown-wheel 36 centred on axis A and fixed to the lower plate 33. Support means, not shown, may be provided for supporting plates 32,33 and the accessory parts such as pump 31 etc. while allowing free rotation about axis A.

The angular amplitude of the rotation of plates 32,33 about axis A, controlled by motor 34, depends on the change of heading ordered by the pilot, by means of a heading transcription device.

Plates 32,33 comprise in their central portion two circular apertures 37,38 in which are placed two circular discs 39,40 whose centre is located on axis A and which are maintained motionless in rotation about this axis A. Discs 39,40 are made of a transparent material, particularly of glass, and sealing means are provided between the periphery of these discs and the inner edge of apertures 37,38 so as to allow sealed rotation of plates 32,33 in relation to motionless discs 39,40.

These discs 39,40 form means for maintaining, during a simulated change of heading, the set of patterns m, situated between these discs, motionless in rotation.

The speed of movement of patterns m is slaved to the simulated speed of the aeroplane. For that, pump 31 is driven by a motor 41 at a speed such that the output of this pump is proportional to the horizontal speed of the aeroplane. As schematically shown, the upstream end of plates 32,33 is sealingly connected by a casing 42 to the delivery side of the pump. The mixture of immiscible liquids is collected, at the downstream end of plates 32,33 in the direction of flow shown by arrow f, by piping 43 which ensures the return of the liquid to the suction side of the pump; the mixture thus circulates in a closed circuit.

An emulsionizer device 44 is provided downstream (or upstream) of discs 39,40 or even in piping 43. This device 44 comprises a propeller 45, located between plates 32,33 and rotated so as to maintain the emulsion of the two immiscible liquids formed by drops of one liquid in the other.

The assembly of plates 32,33, emulsionizer 44, pump 31 and motor 41 driving the pump is mounted so as to be able to rotate about axis A.

The patterns m which move past between discs 39,40 are optically projected by a variable focal length lens 46, or zoom, on to the image 4 forming a representation of the Earth's surface.

The optical axis of zoom 46 merges with axis A.

The set of patterns formed by the patches of drops of immiscible liquids is lighted up by a lamp 47 situated on the side opposite lens 46 in relation to plates 32,33.

So as to maintain constant luminosity at the image of the set of patterns m, whatever the magnification of lens 46, which magnification depends on the simulated altitude of the aeroplane, a lighting zoom 48 is provided whose magnification is modified in response to that of lens 46, so that the luminosity of the projected image of the set of patterns m on image 4 remains constant.

The light beam leaving lens 46 passes through a distorting lens 49 arranged, as explained further on, so as to restore the angles at which the pilot sees successively the same object when the horizontal distance from this object to the point situated straight above the pilot varies.

A complementary lens 50, combined with a mirror 51, may be provided for ensuring the superimposition of the image of the set of patterns m on image 4 of the Earth's contour.

The total image of the Earth's contour comprising, superimposed, image 4 and the set of patterns m is projected by optical means 12 on to the concave spherical surface 3a by the optical projection means already described above. It is to be noted that if image 4 were mounted on a rotary turntable so as to rotate mechanically in response to the variations of heading ordered by the pilot, it would be necessary to provide, e.g. between lens 46 and mirror 51, optical rotation means such as a Wollaston prism which, during mechanical rotation of image 4, would ensure a corresponding rotation of the set of patterns m so that this set of patterns m maintains a fixed angular position in relation to the contour of image 4.

Such being the case, the operation of the device with simulation of the ground moving past is the following. We will assume first of all that the pilot maintains a constant heading and flies at a definite altitude at a constant speed.

Under these conditions, plates 32,33 maintain a constant orientation and pump 31 causes the emulsion of the two immiscible liquids to circulate at a constant speed between discs 39,40.

The set of patterns m which moves past between discs 39,40 is projected on to image 4. A pattern m will cross this image 4 from one edge of the contour of the Earth's horizon to the other at a speed depending on the output of the pump and so on the simulated horizontal speed of the aeroplane.

These patterns moving past are projected by optical means 12 on to the concave spherical surface so that the pilot in the simulator will see patches which move on the surface of the Earth from one edge of the horizon to the other. This moving past of the patches gives the pilot the impression of the ground moving past.

There is restored as it were the impression of the ground moving past which a pilot may have flying over a desert comprising sand dunes, the projected patches of shadows or light corresponding to the lighted or shaded parts of these sand dunes.

When the pilot orders a variation of altitude, the magnification of the variable focal length lens 46 is modified. If the pilot orders a climb, the focal distance of zoom 46 is reduced so that the field of disc 39 embraced will be greater and each pattern, formed by a drop of liquid, will appear smaller on screen 3a. The pilot will have the impression of moving away from the ground because of the reduction of the dimensions of the patches on the ground.

If, on the other hand, the pilot dives towards the ground, the focal distance of the zoom will increase and each patch or elementary pattern will grow bigger on screen 3a. The pilot will then have the impression of approaching the ground since the objects seen on the surface of this ground will increase in dimensions. Furthermore, the period of time for the liquid mixture to pass at the same speed between discs 39,40 in the field of zoom 46 will be shorter when the focal distance of this zoom increases; the pilot will have the impression of a greater angular speed of the patterns whose images are moving past on screen 3a. This effect contributes to increasing the impression of piloting close to the ground.

Figure 5:
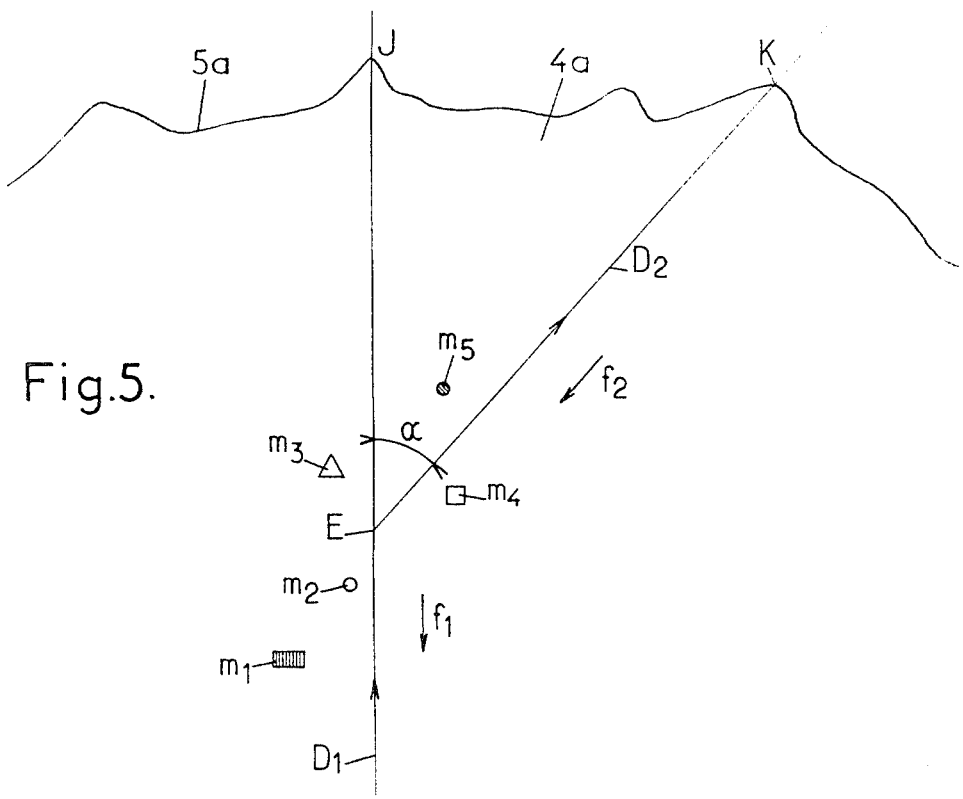
FIG. 5 is a diagram for explaining the simulation of the movement of the ground with alteration of heading.

In FIG. 5 there is schematically shown a part of image 5a of the contour separating the ground image from that of the sky. This contour 5a corresponds to the horizon seen by the pilot.

On image 4a of the ground are superimposed the images of patterns $m_1, m_2, \ldots m_5$ corresponding to different shaped drops or patches of the immiscible liquids. So as to distinguish these different patterns, they have been conventionally shown by different geometrical shapes, rectangle, square, triangle etc.

When the pilot simulates a flight following a constant heading, shown by direction $D_1$ which passes through point J of the horizon line, patterns $m_1 \ldots m_5$ will move in the direction of arrow $f_1$. The pilot will have the impression of flying towards point J because patterns $m_1 \ldots m_5$ are moving past underneath him. For restoring this impression, plates 32,33 will have their large direction turned in direction $D_1$ and the pump will deliver the mixture of liquids in the direction of arrow $f_1$.

It can be seen, according to FIG. 5, that when the pilot simulates a flight with heading $D_1$, pattern $m_1$, then pattern $m_2$, then pattern $m_4$, then pattern $m_3$ will be successively flown over.

To explain the simulation of the change of heading, this change will be broken down by passing through an intermediate stage corresponding to on the spot flight. This is the case for example of a helicopter in stationary flight; after following heading $D_1$ the pilot takes his bearings to follow heading $D_2$.

The change of heading is effected above point E in stationary flight.

The simulation of stationary flight is obtained by stopping the operation of pump 31 which no longer delivers an output. Therefore, patterns m remain motionless in translation.

To simulate this change of heading, the rotation of the horizon line and of the set of patterns is caused about point E. This rotation is obtained by rotating together image 4 and the image of the superimposed patterns. This rotation is obtained by means of the Wollaston prism 8a (FIG. 3). Image 4 remains motionless; the image of the set of patterns projected on this image 4 must also remain motionless. This is indeed the case since this set of patterns remains motionless through the inertia of the liquid and is between two fixed discs 39,40 and the set of patterns adheres to these fixed discs.

With the new heading $D_2$, the pilot sees in front of him the point K of the horizon line; when the pilot ceases stationary flight to go over to horizontal flight with heading $D_2$, he must have the impression of moving towards point K and the set of patterns $m_1 \ldots m_5$ appearing on the ground must move, in relation to the pilot, in the opposite direction, following arrow $f_2$.

When the pilot simulated the movement with heading $D_1$, points $m_4$ and $m_5$ appeared as being on the right of the pilot. When the pilot moves following simulated heading $D_2$, point $m_4$ remains on his right, but point $m_5$ is passed on his left, as can be understood from FIG. 5.

This is indeed what happens for, during the change of heading, plates 32,33 have rotated through an angle equal to angle $\alpha$ formed between directions $D_1$ and $D_2$ so that when horizontal flight is resumed, pump 31 will set in motion the liquid in the direction shown by arrow $f_2$.

But it is important to note that the set of patterns $m_1 \ldots m_5$ seen by the pilot during the change of heading has remained fixed in rotation, in relation to the horizon line, whereas plates 32,33 were rotating.

These conditions are necessary to restore a good impression of the ground moving past, even during a change of heading.

For the purposes of explanation, the change of heading has been broken down by passing through a stationary flight during which this change of heading takes place.

It will be understood that in practice all these movements are linked up one after the other without it being necessary to pass through stationary flight.

In particular, because discs 39,40 are motionless, the set of patterns situated between these discs will remain motionless in rotation during the change of heading, even if pump 31 continues to deliver an output during this change of heading.

Thanks to the memory means formed by discs 39,40, the ground flown over by the pilot remains the same, during a change of heading, but the axis along which it moves past is different, in response to this change of heading.

The distorting lens 49 contributes to improving the simulation of moving past, by modifying the size of the images of the patches projected on to the spherical surface 3a according to the horizontal distance separating the simulated object from the point situated straight above the pilot.

The determination of the characteristics and the role of this distorting lens 49 can be explained by referring to the diagram of FIG. 6.

In this diagram, the position of the pilot's eyes is shown at 0, at a distance Z above the ground.

There has been shown on the ground a patch having a constant horizontal length t situated at two distances $l_1, l_2$ from point p situated straight beneath the pilot's eyes.

Since distance $l_1$ is greater than distance $l_2$ it appears that the pilot will see the same patch of length t at a smaller angle $\theta_1$, at distance $l_1$, than at angle $\theta_2$ for distance $l_2$.

Images $t_1$ and $t_2$ projected on to the spherical surface 3a of the same patch will then have to have different dimensions, which increase progressively as the object draws near the pilot.

The distorting lens 49 is accurately arranged so as to restore this impression of increasing of the angle at which are seen the objects as they draw near the pilot.

As can be seen in FIG. 3, the general shape of the distorting lens 49 is substantially that of a W.

The impression of the ground moving past is restored without severe limitation of the possible variations of the heading of the aircraft and of the simulated distance travelled by this aircraft in any direction whatsoever.

The provision of the patterns which move past over the image by means of a mixture of immiscible liquids is particularly simple.

It will however be understood that other embodiments would be possible, e.g. by means of mobile drawings or cards a part of which, corresponding to the patterns situated between the fixed circular discs 39,40, could be maintained motionless in rotation to satisfy the conditions necessary for good simulation of the ground moving past.

The projection device of the invention permits the projected image of the horizon to be moved over the whole of the inner surface 3a of a sphere; it permits, in particular, a flight on the back (roll) to be simulated.

The performances of this simulator are then interesting.

The movements of the projection of the image over the concave spherical surface are obtained essentially with optical means, so that there are no motionless interfering shadows appearing on the inner surface of the sphere. Such motionless interfering shadows would reduce the simulation effect.

I claim:

1. An horizon projection device for an aircraft simulator comprising:
    an image forming an aerial representation of a part of the Earth's surface;
    optical means for projecting the image on a concave spherical surface;
    a scanning device for moving the projection of the image over the concave spherical surface;
    rotation means for rotating the projection of the image about its center;
    control means responsive to the heading, attitude and altitude of the aircraft simulated to the pilot for controlling the projection of the image, the dimensions of the image and the scanning device to provide the projection of the horizon with the position and the dimensions corresponding to alterations of the course of the aircraft;
    variable magnification optical means between the image and the wide angle lens, said variable magnification optical means being adapted to form an intermediate image in the focal plane of the wide angle lens, the dimensions of the intermediate image depending upon the magnification of said variable magnification means, said control means responsive to the altitude of the aircraft being coupled to control the magnification of the variable magnification optical means, and comprising means responsive to simulated turning of the aircraft over on its back for modifying the magnification of the variable magnification optical means, whereby when a pilot within the simulator controls the simulation of the aircraft to turn over on its back, the apparent variation of altitude is compensated;
    means for causing a set of patterns to move across said image at speed dependent upon the simulated speed of said aircraft with respect to ground;
    means for rotating the overall direction of movement of the patterns in response to the action of the pilot on the heading of the aircraft;
    and means for maintaining the set of patterns motionless in relation to the center of said set during a simulated change of heading, in relation to the contour of said image, the patterns, adapted to move across the image forming an aerial representation of a part of the Earth's surface, being formed by luminous or dark patches, obtained by a mixture of immiscible liquids having closely related densities, means for setting said immiscible liquids in motion, this mixture of liquids being set in motion between two transparent plates whereby the plates and the liquids flowing between the plates may rotate about an axis perpendicular to the mean plane of said plates, the means for maintaining the set of patterns motionless in rotation during a simulated change of heading comprising two fixed circular discs disposed sealingly in apertures provided in said plates, these discs being formed from a transparent material and having their center located on the rotational axis of the plates, whereby during rotation of the plates, corresponding to a change of heading, the set of patterns formed by the mixture of immiscible liquids remains motionless due to the inertia of the liquids and the adhesion of these liquids to the surfaces of the motionless discs.

2. A device according to claim 1, wherein the mixture of immiscible liquids is formed by a mixture of silicon oil and water, one of these two liquids being coloured.

3. A device according to claim 1, wherein the output of the means setting in motion the mixture of immiscible liquids is slaved to the simulated speed of movement of the aircraft, so that the speed at which the patterns move past is in relation with the speed of the aircraft.

4. A device according to claim 1, wherein a propeller disposed between the plates, upstream of the motionless discs form an emulsionizer to maintain the presence of the patterns formed by drops of liquid.

5. A device according to claim 1, comprising a variable focal length lens, the magnification of which depends on the altitude of the aircraft, for the optical projection of the set of patterns on the image for forming an aerial representation of a part of the Earth's surface, and a light beam disposed on the side of the plates and the discs opposite the variable focal length lens, for lighting the set of patterns.

6. The horizon projection device of claim 1, wherein said transparent plates are of glass.

* * * * *